United States Patent [19]

Hamlin

[11] Patent Number: 5,312,014

[45] Date of Patent: May 17, 1994

[54] BEVERAGE DRINKING DEVICE CAPABLE OF MAKING ICE CREAM FLOATS

[75] Inventor: Dennis L. Hamlin, Spokane, Wash.

[73] Assignee: D-N-S Marketing, Inc., Spokane, Wash.

[21] Appl. No.: 958,022

[22] Filed: Oct. 6, 1992

[51] Int. Cl.$^5$ .............................................. A47G 19/22
[52] U.S. Cl. ..................................... 220/703; 220/212;
220/23.86; 220/501; 220/711; 220/713;
220/717; 215/100 R; 215/DIG. 8; 426/115;
426/119; 426/130
[58] Field of Search ................... 220/212, 23.83, 23.86,
220/501, 505, 521, 527, 694, 703, 711, 713, 717,
DIG. 8, 4.07; 215/100 R, 6, 227, DIG. 8;
426/115, 119, 120, 130

[56] References Cited

U.S. PATENT DOCUMENTS

| | | | |
|---|---|---|---|
| 1,213,319 | 1/1917 | Whitaker | 220/713 X |
| 2,975,925 | 10/1960 | Chambers | 215/100 |
| 3,302,644 | 2/1967 | Kennedy et al. | 215/227 X |
| 3,743,520 | 7/1973 | Croner | 220/521 X |
| 3,779,372 | 12/1973 | de Lloret | 215/6 X |
| 3,940,008 | 2/1976 | Flanders | 220/4.07 |
| 4,221,291 | 9/1980 | Hunt | 426/115 X |
| 4,333,581 | 6/1982 | Flansburg | 220/501 |
| 4,478,346 | 10/1984 | Spong | 220/711 |
| 4,874,618 | 10/1989 | Seaborne et al. | 426/115 X |
| 5,071,042 | 12/1991 | Esposito | 220/711 X |
| 5,085,330 | 2/1992 | Paulin | 215/6 |

Primary Examiner—Allan N. Shoap
Assistant Examiner—Vanessa Caretto
Attorney, Agent, or Firm—Wells, St. John, Roberts, Gregory & Matkin

[57] ABSTRACT

A float maker of the preferred embodiment consists of a mug and a removable mixing cap which is connectable to and detachable from the mug. The mixing cap covers a mug opening to define a lower chamber for containing carbonated soda pop. The mixing cap has detachable interlocking upper and lower sections which can be alternately assembled to define an upper chamber or disassembled. The lower section has a cylindrical sleeve which fits within and sealingly abuts against an interior surface of the mug. The lower section has a floor which separates the upper and lower chambers, and an entrance aperture formed along the periphery thereof to provide fluid passage between the upper and lower chambers. Similarly, an exit aperture is provided in the periphery of the upper section to provide fluid passage from the upper chamber. The entrance and exit apertures are offset from a central axis to facilitate flow of the beverage and to help reduce the melt rate of the ice cream contained in the mixing cap. Additionally, the upper and lower sections are rotatable relative to each other to adjust the amount of ice cream surface area contacted by the beverage to thereby control the float mixture according to one's desired taste.

26 Claims, 10 Drawing Sheets

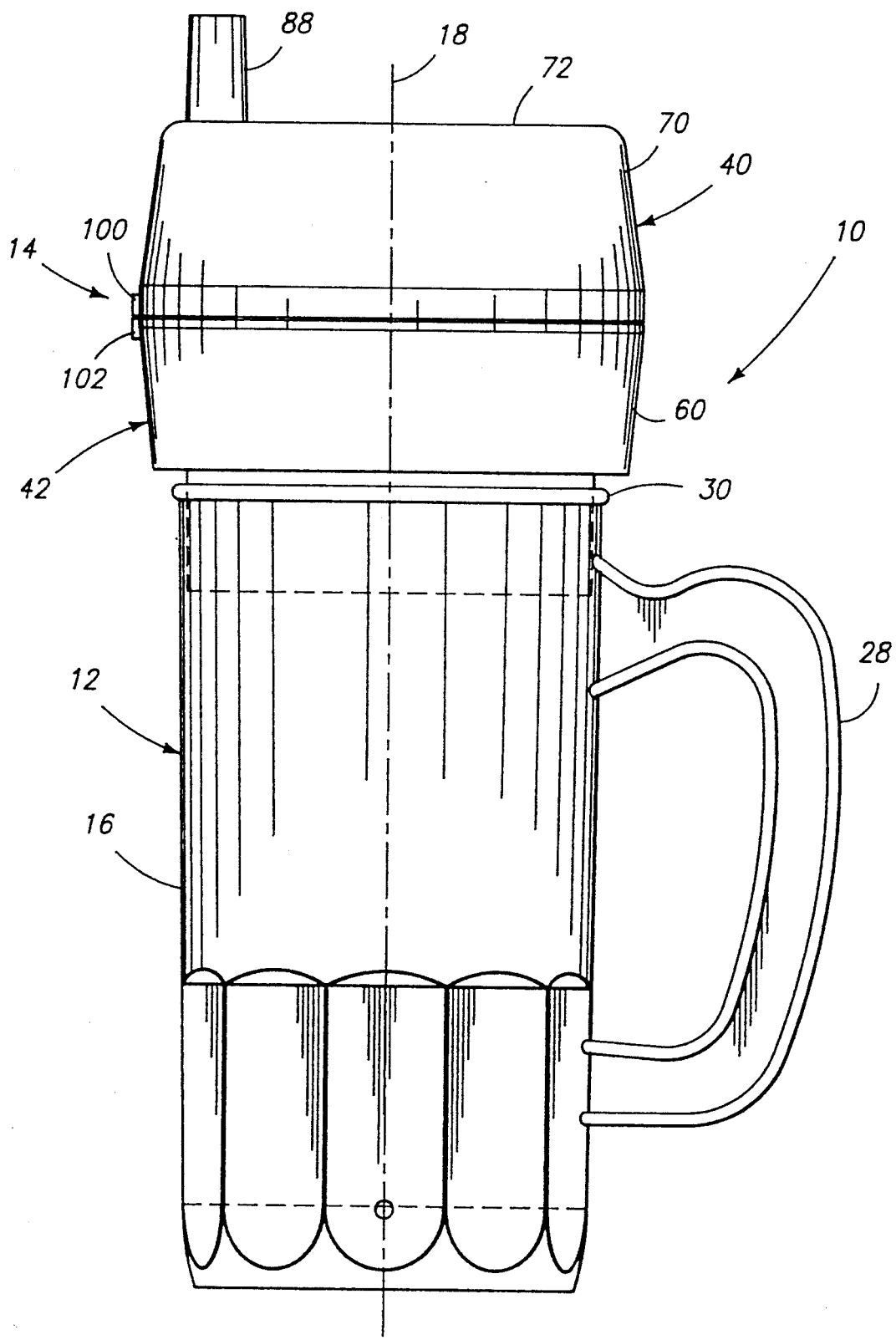

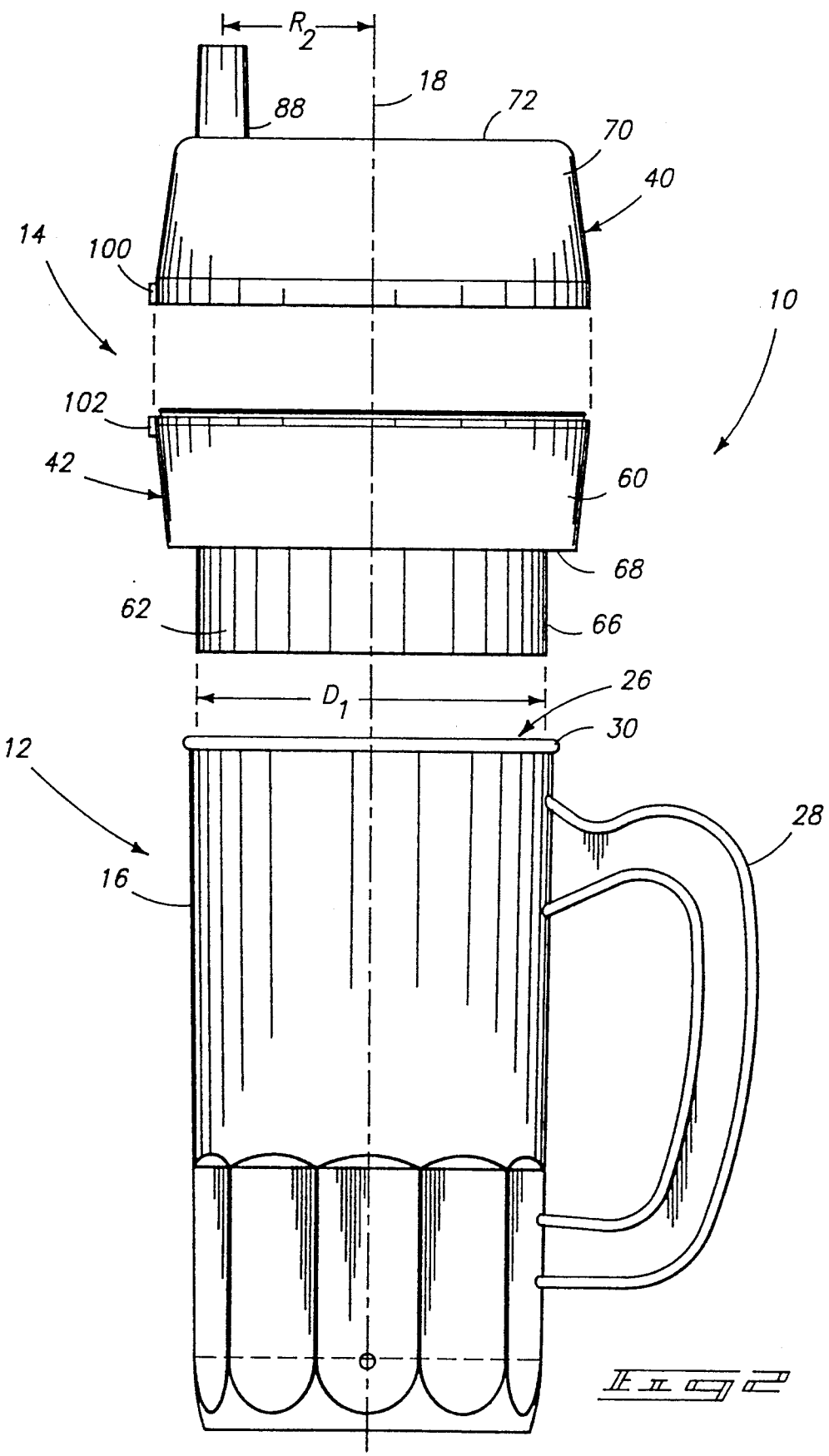

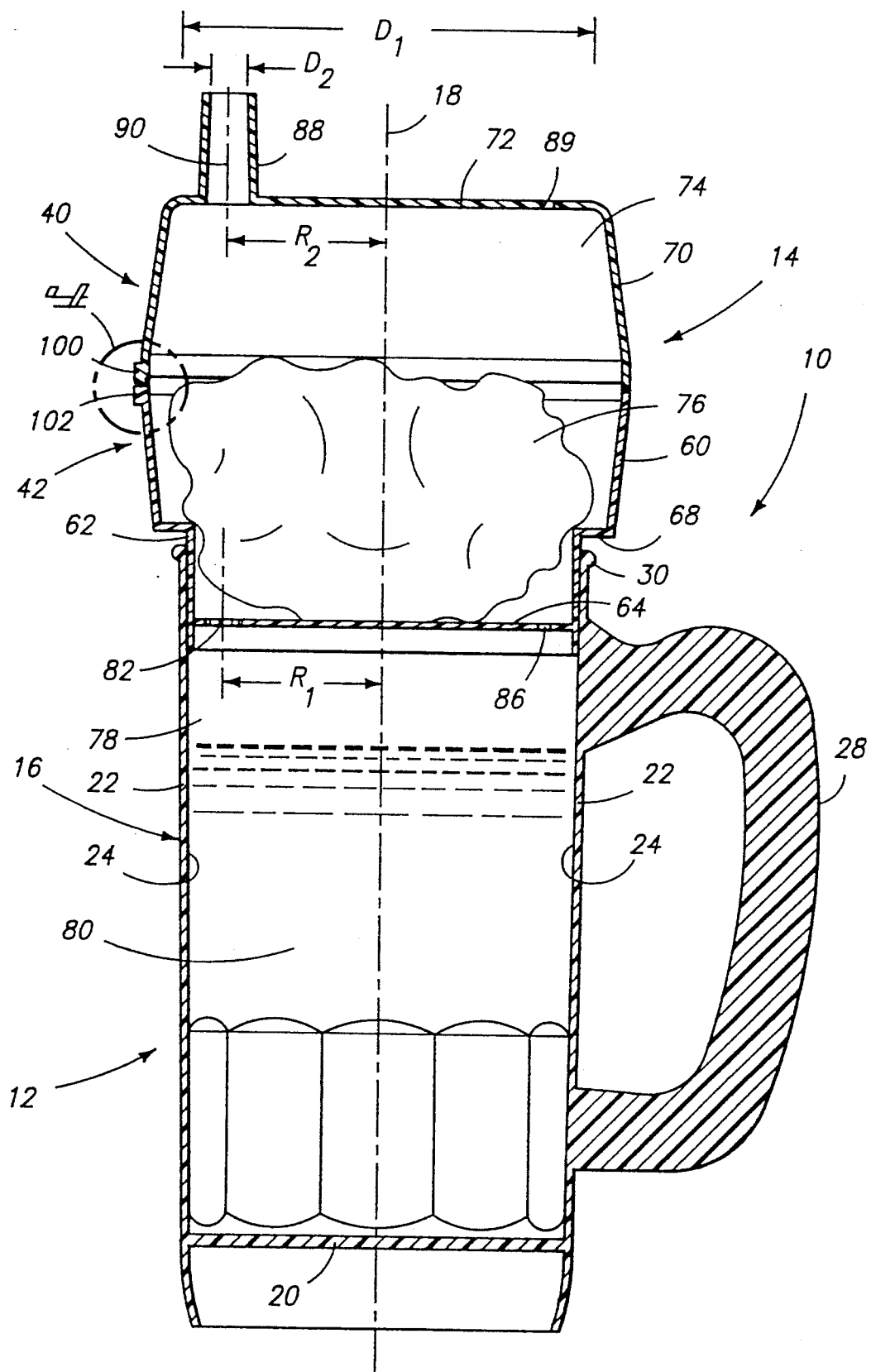

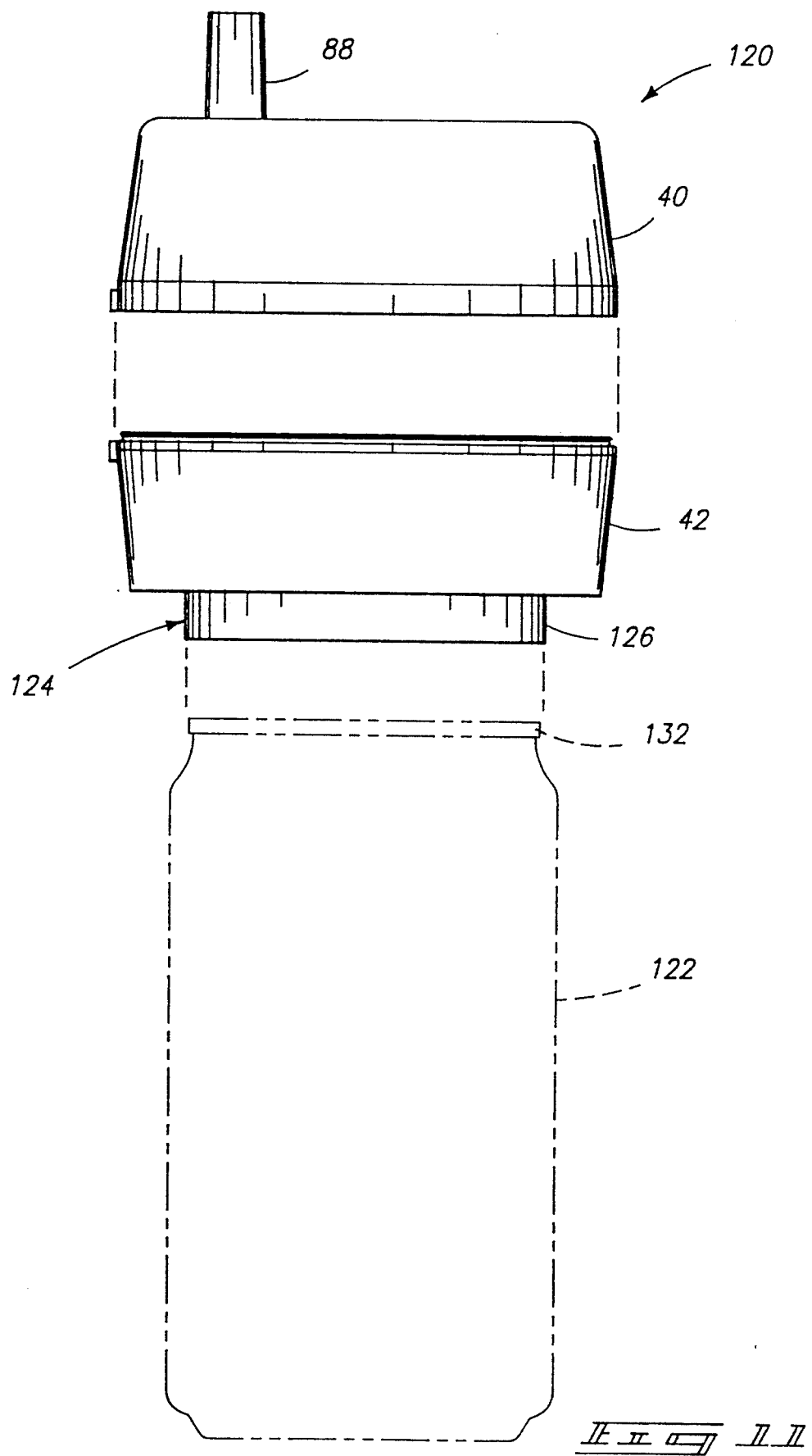

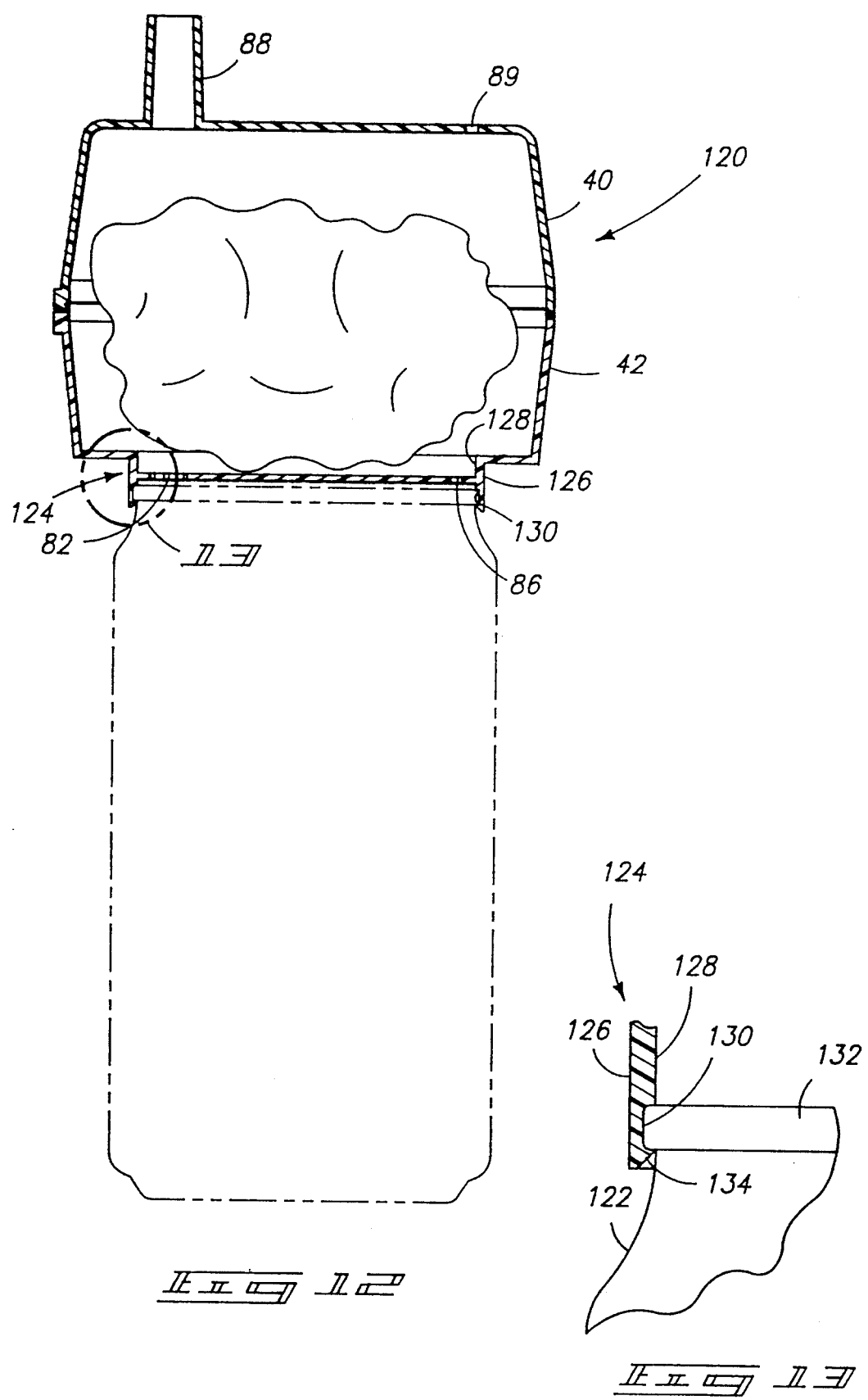

5,312,014

BEVERAGE DRINKING DEVICE CAPABLE OF MAKING ICE CREAM FLOATS

TECHNICAL FIELD

This invention relates to a beverage drinking device and more particularly, to a beverage drinking device forming an ice cream float maker.

BACKGROUND OF THE INVENTION

One of America's most favorite treats is an ice cream float. This treat consists of a mixture of carbonated soda pop and a scoop of ice cream. The ice cream is initially at a much lower temperature than the soda pop. Once placed in the soda pop, however, the ice cream begins to melt to create a delicious foamy and syrup-like mixture.

One of the problems with ice cream floats, as parents can attest, is that they can be messy. When the ice cream is scooped into the carbonated drink, a spontaneous fizz or foam is created which inevitably rises faster than any person can sip and thereby spills over the lip of the glass onto the kitchen counter or floor.

A separate problem unrelated to ice cream floats concerns cooling beverages with ice. When the ice is initially deposited into a cup of liquid, the ice begins to melt in the warmer beverage. Over time, the melted ice dilutes the drink and degrades the flavor of the beverage.

One solution to these problems was proposed in U.S. Pat. No. 2,975,925 to Chambers, which issued Mar. 21, 1961. The '925 patent discloses a container attachment adapted for the neck of a pop bottle which supports a ball of ice cream or ice above the carbonated beverage contained in the bottle. The container is spherical shaped and constructed in two hemispherical sections which are connected at a medial location of the sphere. The container has two similarly shaped and sized necks provided on diametrically opposing sides of the sphere. One neck inserts into the bottle, and the other neck accommodates the mouth of a person. The necks are hollow to provide fluid access to and from the sphere chamber. In this manner, when the user tips the bottle up, the beverage flows in the first neck, around the ice cream or ice, and out the second neck into the users mouth.

The container attachment of the '925 patent has several drawbacks. First, the input neck is diametrically opposed on the sphere from the output neck. This is disadvantageous because a user must tip the bottle near vertical to receive any liquid through the centralized neck portion provided for the user's mouth. If the container neck is not adequately secured within the bottle, the container attachment can become loose or fall out of the bottle causing the soda pop to spill all over the user.

Another drawback of the container disclosed in the '925 patent is that there are no vents or air holes provided in the spherical chamber apart from the two hollow necks. This significantly impairs the flow of the beverage. The absence of these vents is dictated by the spherical shape which channels the liquid (when the bottle is tipped upward) to the neck portion adapted for a user's mouth. If a vent was positioned at or near this neck, it would allow the beverage to leak from the container and spill onto the user.

A third drawback of this container is that the liquid always comes into contact with a large part of the ice cream surface area as a result of the central, diametrically opposing placement of the two necks on the sphere-shaped container. This results in an increased melt rate as the warmer liquid flows across most of the frozen ice cream surface.

This invention provides a mixing cap for housing ice cream or other edibles which is adapted for use with a mug or soda pop can. The cap of this invention eliminates the drawbacks discussed above with respect to the '925 patent.

BRIEF DESCRIPTION OF THE DRAWINGS

Preferred embodiments of the invention are described below with reference to the following accompanying drawings.

FIG. 1 is a side elevation view of a float maker having a mixing cap and mug constructed according to a first embodiment of this invention.

FIG. 2 is an exploded side elevation of the FIG. 1 float maker.

FIG. 3 is a cross-sectional side view of the FIG. 1 float maker.

FIG. 11 is an exploded side elevation view of the FIG. 10 float maker.

FIG. 12 is a cross-sectional side view of the FIG. 10 float maker.

FIG. 13 is an enlarged fragmentary view taken within circle 13—13 in FIG. 12 which illustrates an interconnection of the FIG. 10 float maker to a soda pop can.

DETAILED DESCRIPTION OF THE PREFERRED EMBODIMENTS

Figure 5:
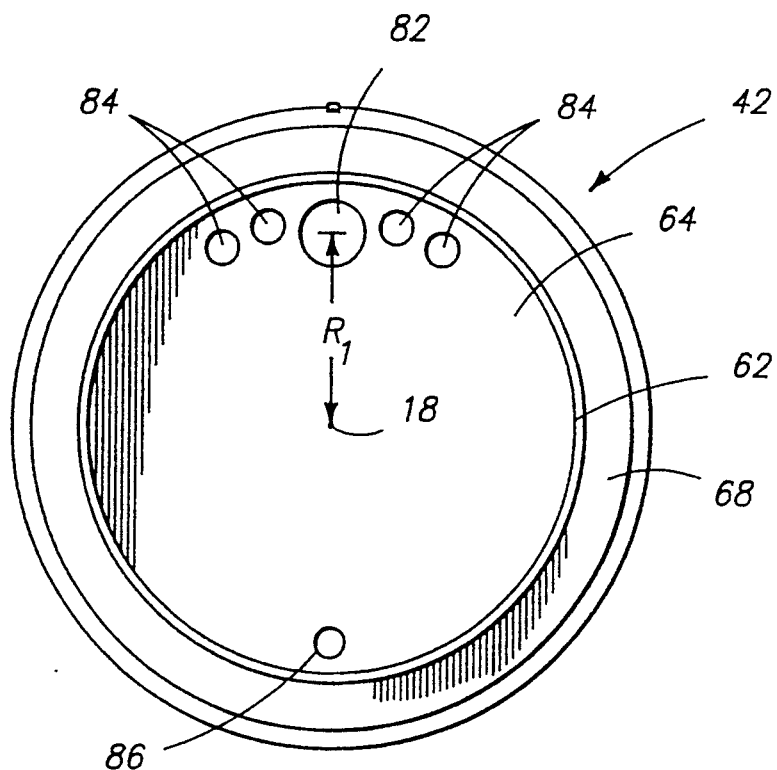
FIG. 5 is a bottom plan view of the mixing cap employed in the FIG. 1 float maker.

This disclosure of the invention is submitted in furtherance of the constitutional purposes of the U.S. Patent Laws "to promote the progress of science and useful arts" (Article 1, Section 8).

This invention relates to a beverage drinking device which is useful for making ice cream floats, flavored drinks, or non-diluted chilled beverages. While there are several applications of this invention, the preferred embodiments will be discussed in the context of an ice cream float maker.

FIGS. 1-6 show a first embodiment of a float maker 10 constructed according to this invention. Float maker 10 includes a mug 12 and an enclosure or mixing cap 14 which is connectable to or detachable from mug 12.

Mug 12 has a substantially cylindrical body 16 which is aligned along vertical central axis 18. As shown in FIG. 3, body 16 has a base 20, side walls 22, and an interior surface 24 which define an inner cavity. Mug 12 has an opening 26 (FIG. 2) provided at one end thereof opposite base 20. Opening 26 has a diameter $D_1$ (FIG. 3) and a cross-sectional area $A_1$ as follows:

$$A_1 = \pi \times (D_1 \div 2)^2$$

Side walls 22, base 20, and opening 26 thereby define a beverage container. Mug 12 also has a handle 28 mounted to sidewall 22 of body 16 and an annular lip 30 at the upper end of body 16 at opening 26.

Mixing cap 14 is adapted to fit within opening 26 of mug 12. Mixing cap 14 has a first or upper enclosure section 40 and a second or lower enclosure section 42 which are aligned along central axis 18. Upper and lower sections 40 and 42 can be mated together in an assembled state (FIGS. 1 and 3) or separated from one another in a disassembled state (FIG. 2).

Lower section 42 has frustoconical sidewalls 60, a cylindrical sleeve 62, and a floor 64 (FIG. 3). Sidewalls 60 and cylindrical sleeve 62 are preferably symmetrical about central axis 18. Cylindrical sleeve 62 has an exterior surface 66 (FIG. 2) which is complementary in size and shape to insert within, and abut against, interior surface 24 of mug 12 when mixing cap 14 is connected thereto. Mixing cap 14 is thereby frictionly mounted to mug 12 by pressing sleeve 62 into mug opening 26. The sleeve fits snug against mug interior surface 24 to provide a fluid seal therebetween to prevent leaks.

Lower section 42 has a shoulder 68 which extends radially outward from central axis 18 beyond exterior sleeve surface 66 to connect sleeve 62 to sidewall 60. Shoulder 68 and upper lip 30 of mug 12 provide a stop to limit the travel or extent to which sleeve 62 is inserted into the mug opening 26. Mixing cap 14 is preferably designed to be inserted into mug 12 to a depth in which shoulder 68 does not contact lip 30 (FIGS. 1 and 3). However, this maximum shoulder/lip stop is provided to prevent over-insertion which would make disassembly difficult.

Figure 4:
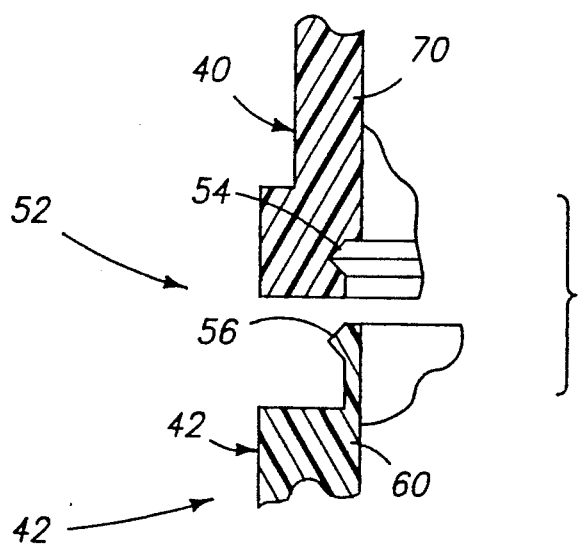
FIG. 4 is an exploded, enlarged fragmentary view taken within circle 4—4 in FIG. 3 which illustrates a connection between upper and lower sections of the mixing cap employed in this invention.
Figure 6:
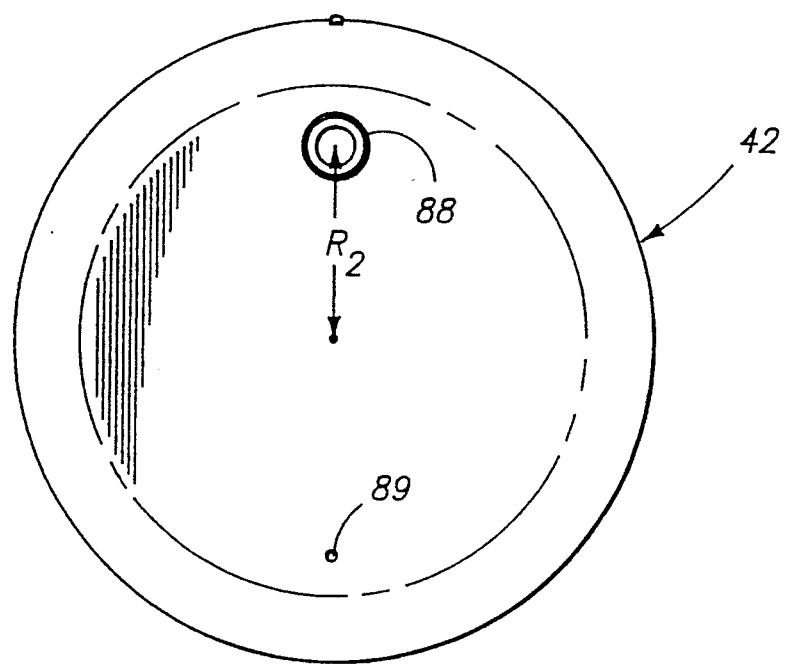
FIG. 6 is a top plan view of the mixing cap employed in the FIG. 1 float maker.

Upper section 40 of mixing cap 14 has frustoconical sidewalls 70 and roof 72. As illustrated in FIG. 4, upper section sidewalls 70 and lower section sidewalls 60 have a complementary interlocking means 52 provided thereon for connecting the upper and lower sections of mixing cap 14. Upper section 40 has a V-shaped groove 54 formed in an interior surface of side wall 70. Lower section 42 has a complementary V-shaped flange or projection 56 provided on the peripheral edge of side wall 60. Flange 56 can be alternately (1) inserted into groove 54 to fasten the upper and lower sections together, or (2) removed from groove 54 to separate the upper and lower sections.

As shown in FIG. 3, upper and lower sections 40 and 42 define an upper chamber 74 of a volume which is suitable for holding ice cream 76 or other suitable materials, such as ice or solid or semi-solid flavor mixtures. When mixing cap 14 is inserted into mug 12, a lower chamber 78 is formed for containing a liquid 80, such as a carbonated beverage. Floor 64 is lower section 42 separates upper chamber 74 from lower chamber 78. Preferably, the ratio of the volume of lower chamber 78 to the volume of upper chamber 74 is in a range of 1:1 to 3:1, and is most preferably in the range of approximately 1.3:1 to 1.6:1.

As shown in FIG. 5, floor 64 has five entrance apertures 82 and 84 formed adjacent to the periphery thereof. Primary aperture 82 is centered between two pairs of identical secondary apertures 84 and has a diameter which is larger than those of secondary apertures 84. Primary and secondary entrance apertures 82 and 84 provide fluid passage between lower chamber 78 and upper chamber 74 and are sized to facilitate a selected flow rate. The center of primary aperture 82 is spaced a radial distance $R_1$ from central axis 18. Although the preferred embodiment has five fluid entrance apertures 82 and 84, this invention contemplates having one or more such apertures formed in floor 64.

Floor 64 also has an air aperture or vent 86 formed adjacent the periphery and diametrically opposite to primary aperture 82. When the user is drinking from float maker 10, vent 86 permits air displacement between upper chamber 74 and lower chamber 78 to facilitate a smooth fluid flow from lower chamber 78 into upper chamber 74.

With reference to FIG. 3, upper section 40 has an exit aperture or drinking spout 88 formed in roof 72 to provide fluid exit from upper chamber 74. Spout 88 is a cylindrical tube having a longitudinal axis 90 which is substantially parallel to central axis 18. Spout 88 is adapted to project into the mouth of a person. Its center is spaced a radial distance $R_2$ from central axis 18 and has a diameter $D_2$ which is smaller than diameter $D_1$ of mug opening 26. Spout 88 has a cross-sectional area $A_2$ as follows:

$$A_2 = \pi \times (D_2 \div 2)^2$$

Cross-sectional area $A_1$ of mug opening 26 is greater than cross-sectional area $A_2$ of spout 88. Preferably, the ratio of the mug opening cross-sectional area to the spout cross-sectional area (i.e., $A_1:A_2$) is at least 2:1, and is most preferably at least 20:1.

Upper section 40 also has a vent or air aperture 89 (FIGS. 3 and 6) formed adjacent the periphery thereof and preferably, diametrically opposite from spout 88. Vent 89 permits air to pass in and out of upper chamber 74.

According to this invention, entrance apertures 82 and 84 in the lower section 42 and spout 88 in upper section 40 are radially spaced from central axis 18. Radial distance $R_1$ of the entrance apertures 82 and 84 is preferably approximately equal to radial distance $R_2$ of the spout 88. Preferably, apertures 82 and 84 and spout 88 are radially offset from center axis 18 a distance greater than one-quarter of diameter $D_1$ of mug opening 26 and less than one-half of this diameter. This radial offset offers several advantages over prior art designs which have centrally located input and output ports (such as the diametrically opposing necks on the spherical-shaped container disclosed in U.S. Pat. No. 2,975,925). These advantages are shown in more detail in FIG. 7.

In the preferred mode of operation (FIG. 7), spout 88 is rotated approximately 90° relative to handle 28 of mug 12 (the handle is not shown, but is hidden behind mug 12). In FIGS. 1–3, spout 88 is rotated approximately 180° relative to mug handle 28 in order to demonstrate the radial displacement of the spout. This illustrates a first advantage of this invention in that the spout-to-handle relationship is adjustable. The float maker is therefore suitable for both right- and left-handed people. The spout can be 90° relative to the handle for right-handed people and 270° relative to the handle for left-handed people.

Figure 7:
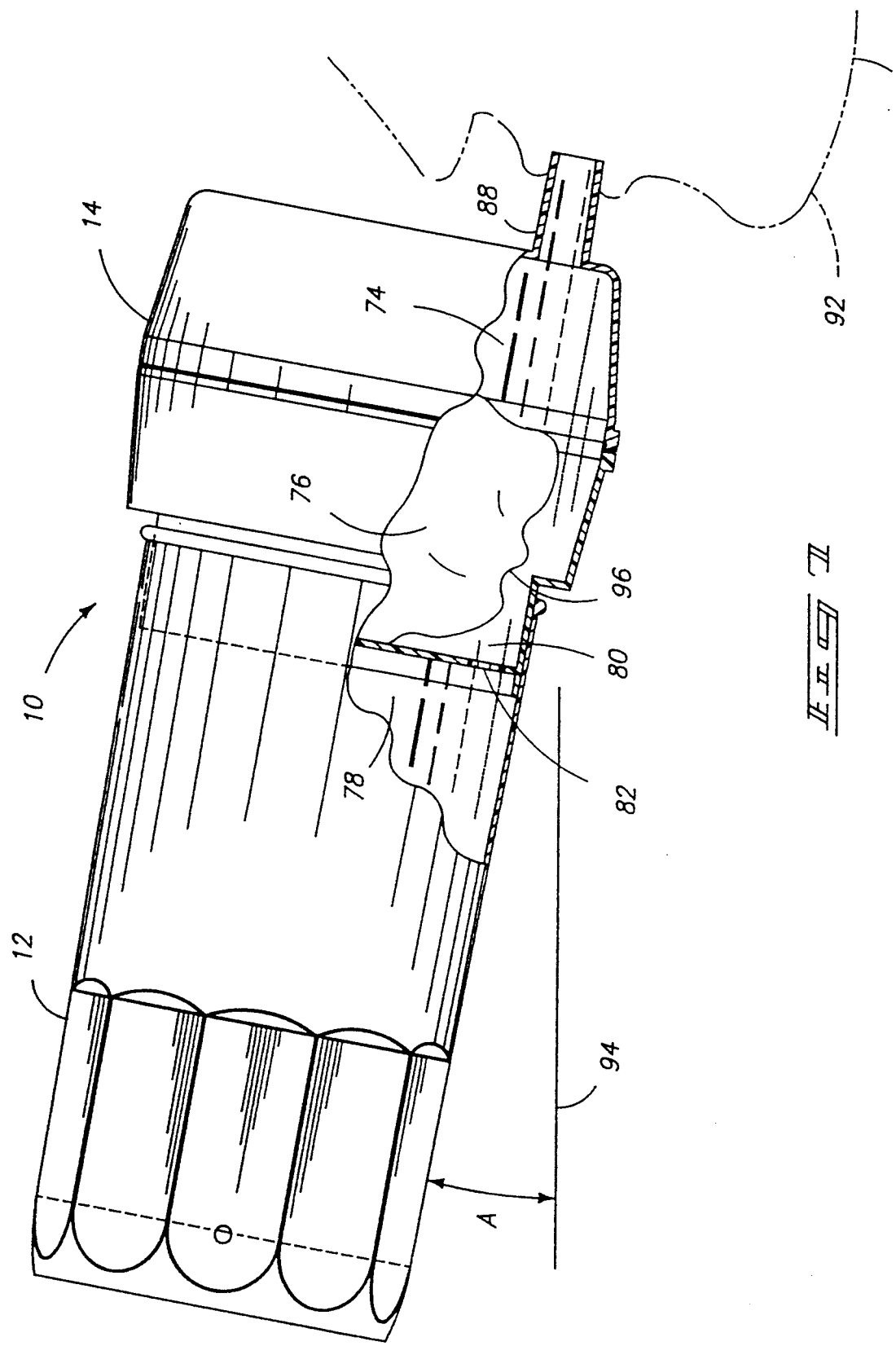
FIG. 7 is a side plan view and partial cross-sectional view of the FIG. 1 float maker, and is illustrated in an operational mode.

A second advantage of the offset positioning of spout 88 and entrance aperture 82 is the degree of tilt required to drain contents from the mug to the user's mouth. As shown in FIG. 7, a user 92 can simply tip float maker 10 slightly above horizontal 94 by a small angle A to drink. At this small angle, liquid contents 80 easily flow from lower chamber 78 of mug 12 through the entrance apertures 82 and 84 into upper chamber 74 to mix with ice cream 76. The five entrance apertures define a flow rate which is sufficient to roll and tumble the ice cream within the upper chamber and thereby enhance the rate of mixture. The resultant float mixture then flows out through spout 88 into the mouth of user 92. Vent 86 provided in lower section 42 and vent 89 provided in upper section 40 allow air passage through both upper and lower chambers to facilitate a steady, even flow of liquid 80. Additionally, the passage area provided by entrance apertures 82 and 84 is greater than the passage area provided by spout 88. As a result, the beverage enters the upper chamber 74 at a higher rate than it exits, thereby allowing the beverage more time to mix with the ice cream.

Another advantage of this invention is illustrated in FIG. 3. By offsetting entrance aperture 82 from radial axis 18, an ice cream scoop 76 is supported on a substantially solid floor 64 which minimizes the ice cream from flowing or melting into lower chamber 78. In contrast, the prior art container shown in U.S. Pat. No. 2,975,925 rests in the neck opening which allows portions or chunks of ice cream to fall down into the soda pop bottle.

Figure 8:
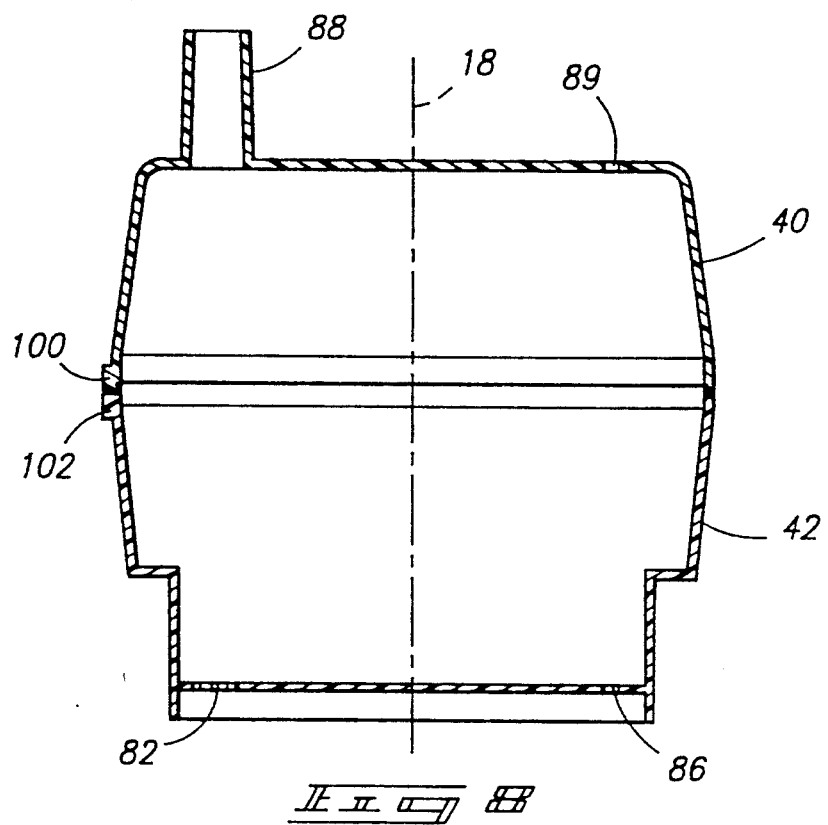
FIG. 8 is a cross-sectional view of the mixing cap and illustrates the upper section in one position relative to the lower section.
Figure 9:
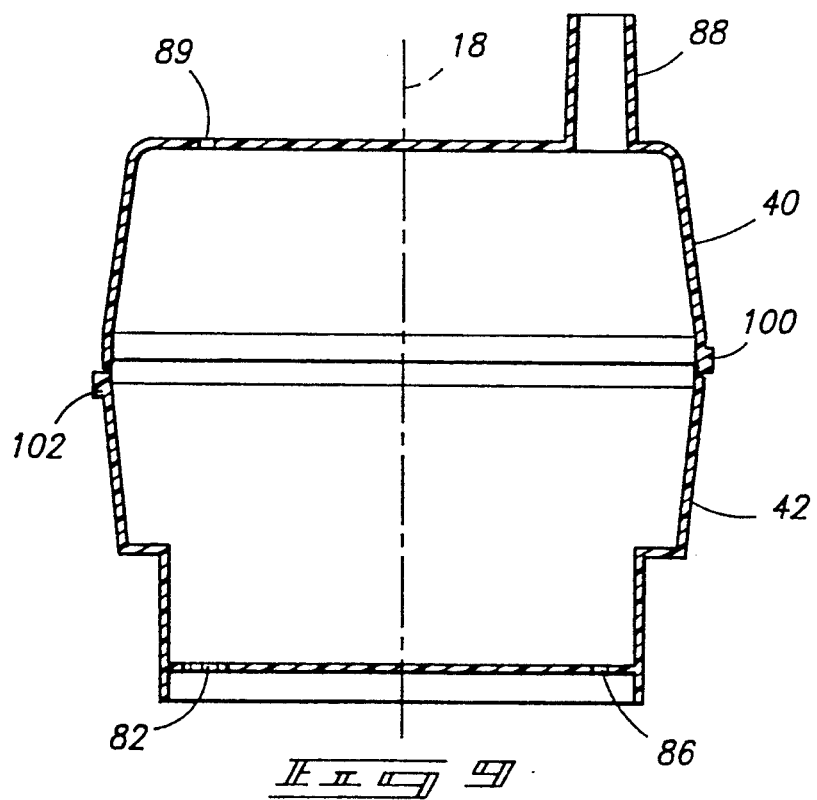
FIG. 9 is a cross-sectional view of the mixing cap and illustrates the upper section in a second position relative to the lower section.
Figure 10:
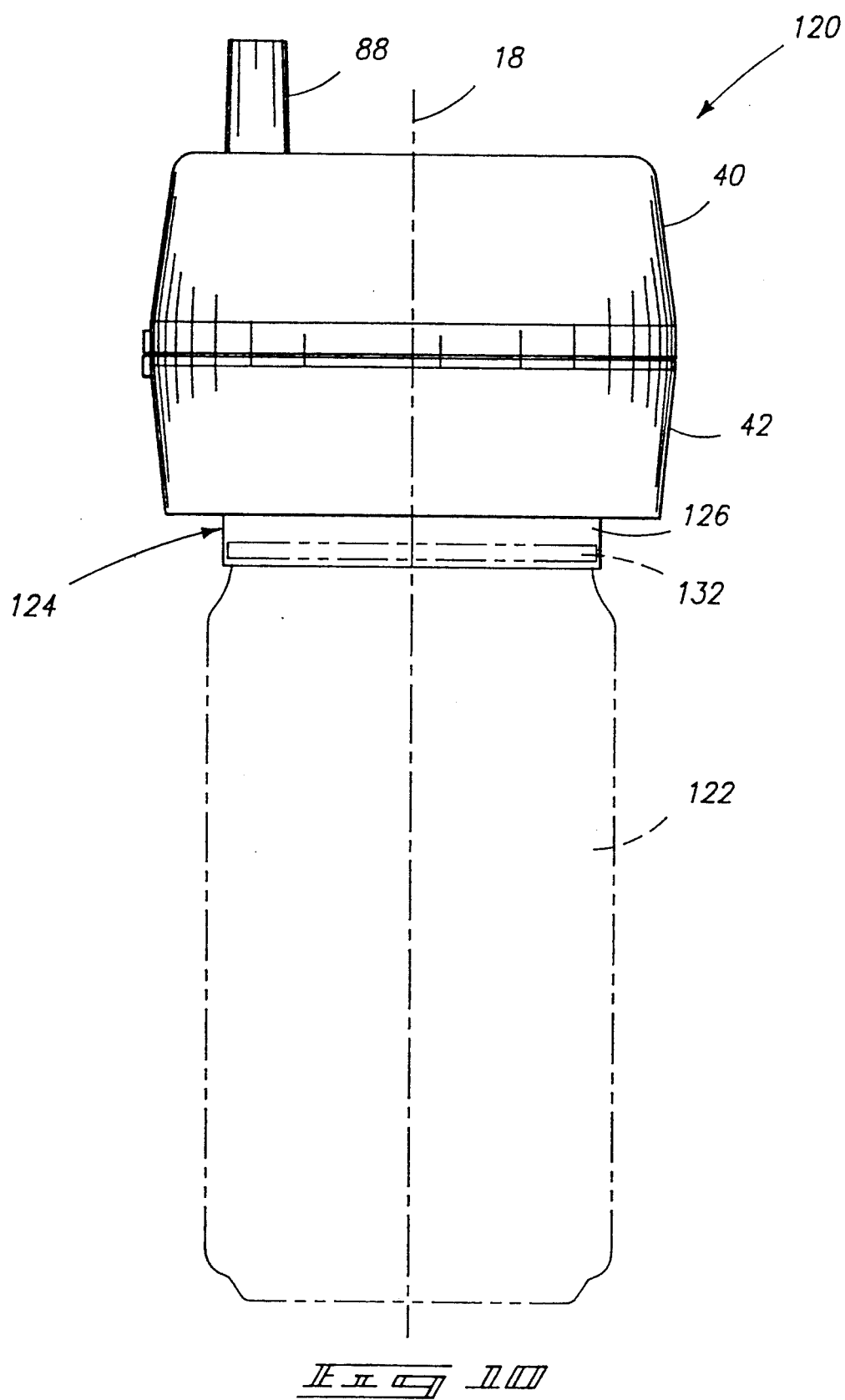
FIG. 10 is a side elevation of a float maker constructed according to a second embodiment of this invention.

Another aspect of this invention is illustrated in FIGS. 8 and 9. The upper and lower sections are rotatable about central axis 18 relative to each other. In this manner, spout or exit aperture 88 and entrance aperture 82 can be selectively aligned (FIG. 8) or misaligned (FIG. 9, in which spout 88 is rotated 180° relative to entrance aperture 82). Mixing cap 14 also has a pair of projections or knobs 100 and 102 provided on both upper and lower sections 40 and 42, respectively. When the entrance and exit apertures are aligned (FIG. 8), knobs 100 and 102 are aligned. However, when the entrance and exit apertures are misaligned (FIG. 9), knobs 100 and 102 are likewise misaligned. Accordingly, these knobs provide an indexing means for visually indicating when the spout and entrance apertures are aligned and misaligned. While knobs are employed in the preferred embodiment, other kinds of demarcations or visually perceptible techniques may be used.

The advantage of an adjustable mixing cap is that a user can effectively program the desired melt and mixture rate of the ice cream housed within mixing cap 14 to suit his or her taste. When the entrance and exit apertures are aligned (FIG. 8), the liquid beverage only contacts a single face of the ice cream, providing a float mixture which has a comparatively low ice cream component. Additionally, the melt rate of the ice cream is comparatively low. In contrast, when upper section 40 is rotated 180° relative to lower section 42 (FIG. 9), the beverage flows from entrance aperture 82 over substantially all of the surface area of the ice cream scoop (not shown in this Figure) and out through spout 88. In this arrangement, the float mixture has a comparatively high ice cream component, and the ice cream melt rate is comparatively greater. The float maker of this invention is thus adjustable to allow a user to obtain the desired float mixture suitable to his or her taste.

FIGS. 10-13 illustrate a second embodiment of a float maker constructed according to this invention. The float maker consists of a mixing cap 120 which is adapted to be detachably connected to a soda pop can 122. Removable mixing cap 120 is substantially identical to mixing cap 14 discussed above. The only substantive difference is in the means for mounting the mixing cap to the soda pop can 122. Accordingly, only the mounting means is discussed in detail with respect to this embodiment. Furthermore, components in this second embodiment which are similar to those in the first embodiment are reference by the same numerals.

Lower section 42 of mixing cap 120 has a cylindrical sleeve 124 provided about central axis 18. Sleeve 124 has an exterior surface 126 and an interior surface 128. As shown in FIG. 13, sleeve 124 has an annular recess 130 formed in interior surface 128. Recess 130 is complementary in size and shape to receive a lip 132 of soda pop can 122. Sleeve 124 also has an L-shaped clip member 134 which connects underneath lip 132. In this manner, mixing cap 120 can be snapped onto, from disconnected from, soda pop can 122 by alternately sliding lip 132 into recess 130 of sleeve 124 or pulling lip 132 from recess 130. L-shaped member 134 is designed to move or deflect slightly to permit the ingress of and egress lip 132.

The float makers of this invention provide a relatively mess-free technique for making ice cream floats. Since the ice cream remains separated from the carbonated beverage, the spontaneous fizz or foam which is caused by placing a scoop of ice cream into a carbonated beverage is effectively eliminated. However, some fizz is still produced as the carbonated beverage runs across the ice cream to create the desired float taste.

In compliance with the statute, the invention has been described in language more or less specific as to structural or methodical features. It is to be understood, however, that the invention is not limited to the specific features described or shown, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A beverage drinking device comprising:
    a mug having a body with a cavity formed therein defining an annular interior surface at an opening, said opening having a first cross-sectional area;
    a removable mixing cap connectable to and detachable from the mug, the mixing cap covering the mug opening to define a lower chamber in the cavity for containing a liquid, the lower chamber having a first volume, the mixing cap comprising:
        detachable interlocking upper and lower sections aligned along a central axis, the upper and lower sections being alternately connected to one another in an assembled state and detached from one another in a disassembled state, the upper and lower sections defining an upper chamber of a second volume when they are connected;
        the lower section having an annular sleeve portion provided about the central axis, the annular sleeve having an exterior surface which is complementary in size and shape to insert within and sealingly mate with the interior surface of the mug when the mixing cap is connected to the mug;

the lower section having a floor which separates the upper and lower chambers, the floor having at least one entrance aperture formed therein and spaced a radial distance from the central axis to enable fluid to flow between the upper and lower chambers;

the upper section having an exit aperture of a second cross-sectional area formed therein and spaced a radial distance from the central axis to enable fluid to flow from the upper chamber;

the upper and lower sections being rotatable relative to each other about the central axis to selectively orient the entrance and exit apertures relative to each other; and the upper and lower sections having indexing means for indicating when the entrance and exit apertures are aligned and when the entrance and exit apertures are not aligned said indexing means located on the exterior of said upper and lower sections.

2. A beverage drinking device according to claim 1, wherein the first cross-sectional area of the mug opening is greater than the second cross-sectional area of the exit aperture.

3. A beverage drinking device according to claim 1, wherein a ratio of the first cross-sectional area of the mug opening to the second cross-sectional area of the exit aperture is at least 2:1.

4. A beverage drinking device according to claim 1, wherein a ratio of the first cross-sectional area of the mug opening to the second cross-sectional area of the exit aperture is at least 20:1.

5. A beverage drinking device according to claim 1, wherein:

the mug has an annular lip provided about the central axis adjacent to the opening; and the lower section has a shoulder positioned adjacent to the sleeve portion which extends radially outward from the central axis beyond the exterior surface of the sleeve portion for engaging the lip to limit an extent to which the sleeve is inserted into the mug.

6. A beverage drinking device according to claim 1, wherein:

a ratio of the first volume to the second volume is in a range of approximately 1:1 to 3:1.

7. A beverage drinking device according to claim 1, wherein:

a ratio of the first volume to the second volume is in a range of approximately 1.3:1 to 1.6:1.

8. A beverage drinking device according to claim 1, wherein:

the entrance and exit apertures are spaced from the central axis at approximately equal radial distances.

9. In a beverage drinking device, a removable mixing cap for use with a mug having an opening, the mixing cap being connectable to and detachable from the mug, the mixing cap comprising:

detachable interlocking upper and lower sections aligned along a central axis, the upper and lower sections being alternately connected to one another in an assembled state and detached from one another in a disassembled state, the upper and lower sections defining a chamber when they are connected;

the lower section having an annular sleeve portion provided about the central axis, the annular sleeve being complementary in size and shape to sealingly fit within the opening of the mug when the mixing cap is connected to the mug;

the lower section having a floor with at least one entrance aperture formed therein and spaced a radial distance from the central axis to provide fluid passage to the chamber;

the upper section having an exit aperture formed therein and spaced a radial distance from the central axis to provide fluid passage from the chamber;

the upper and lower sections being rotatable relative to each other about the central axis to selectively orient the entrance and exit apertures relative to each another; and the upper and lower sections having indexing means for indicating when the entrance and exit apertures are aligned and when the entrance and exit apertures are not aligned said indexing means located on the exterior of said upper and lower sections.

10. In a beverage drinking device, a removable mixing cap according to claim 9, wherein the upper and lower sections have air apertures formed therein.

11. In a beverage drinking device, a removable mixing cap according to claim 9, wherein:

the lower section has an inverted frustoconical shape symmetrical about the central axis; and the upper section has a frustoconical shape symmetrical about the central axis.

12. In a beverage drinking device, a removable mixing cap according to claim 9, wherein:

the exit aperture comprises a cylindrical tube having a longitudinal axis, the axis of the cylindrical tube being substantially parallel to the central axis.

13. In a beverage drinking device, a removable mixing cap according to claim 9, wherein:

the entrance and exit apertures are spaced from the central axis at approximately equal radial distances.

14. In a beverage drinking device, a removable mixing cap for use with a soda pop can having an annular lip, the mixing cap being connectable to and detachable from the pop can, the mixing cap comprising:

detachable interlocking upper and lower sections aligned along a central axis, the upper and lower sections being alternately connected to one another in an assembled state and detached from one another in a disassembled state, the upper and lower sections defining a chamber when they are connected;

the lower section having an annular sleeve portion provided about the central axis, the annular sleeve having an interior surface, an exterior surface and an annular recess formed in the interior surface, the recess being complementary in size and shape to receive the lip of the pop can, the lower section being sealingly connected to the pop can when the lip of the pop can is slid into the sleeve of the lower section and inserted into the recess in the sleeve;

the lower section having a floor with at least one entrance aperture formed therein and spaced a radial distance from the central axis to provide fluid passage to the chamber;

the upper section having an exit aperture formed therein and spaced a radial distance from the central axis to provide fluid passage from the chamber;

the upper and lower sections being rotatable relative to each other about the central axis to selectively orient the entrance and exit apertures relative to each other; and the upper and lower sections having indexing means for indicating when the entrance and exit apertures are aligned and when the entrance and exit apertures are not aligned said indexing means located on the exterior of said upper and lower sections.

15. In a beverage drinking device, a removable mixing cap according to claim 14, wherein the upper and lower sections have air apertures formed therein.

16. In a beverage drinking device, a removable mixing cap according to claim 14, wherein:

the lower section has an inverted frustoconical shape symmetrical about the central axis; and the upper section has a frustoconical shape symmetrical about the central axis.

17. In a beverage drinking device, a removable mixing cap according to claim 14, wherein:

the exit aperture comprises a cylindrical tube having a longitudinal axis, the axis of the cylindrical tube being substantially parallel to the central axis.

18. In a beverage drinking device, a removable mixing cap according to claim 14, wherein:

the entrance and exit apertures are spaced from the central axis at approximately equal radial distances.

19. In a beverage drinking device, a removable mixing cap for use with a mug having an opening, the mixing cap being connectable to and detachable from the mug, the mixing cap comprising:

detachable interlocking upper and lower sections aligned along a central axis, the upper and lower sections being alternately connected to one another in an assembled state and detached from one another in a disassembled state, the upper and lower sections defining a chamber when they are connected;

the lower section having an inverted frustoconical shape symmetrical about the central axis and the upper section having a frustoconical shape symmetrical about the central axis, said lower section having a maximum diameter and a minimum diameter;

the lower section having a cylindrical sleeve portion provided about the central axis, the cylindrical sleeve having a diameter less than the minimum diameter of the lower section and being complementary in size and shape to sealingly fit within the opening of the mug when the mixing cap is connected to the mug;

the lower section having a floor with at least one entrance aperture formed therein and spaced a radial distance from the central axis to provide fluid passage to the chamber; and the upper section having an exit aperture formed therein and spaced a radial distance from the central axis to provide fluid passage from the chamber.

20. In a beverage drinking device, a removable mixing cap according to claim 19, wherein the upper and lower sections have air apertures formed therein.

21. In a beverage drinking device, a removable mixing cap according to claim 19, wherein:

the entrance and exit apertures are spaced from the central axis at approximately equal radial distances.

22. In a beverage drinking device, a removable mixing cap according to claim 19, wherein:

the upper and lower sections are rotatable relative to each other about the central axis to selectively orient the entrance and exit apertures relative to each another;

and wherein the upper and lower sections have indexing means for indicating when the entrance and exit apertures are aligned and when the entrance and exit apertures are not aligned.

23. In a beverage drinking device, a removable mixing cap for use with a soda pop can having an annular lip, the mixing cap being connectable to and detachable from the pop can, the mixing cap comprising:

detachable interlocking upper and lower sections aligned along a central axis, the upper and lower sections being alternately connected to one another in an assembled state and detached from one another in a disassembled state, the upper and lower sections defining a chamber when they are connected;

the lower section having an inverted frustoconical shape symmetrical about the central axis and the upper section having a frustoconical shape symmetrical about the central axis said lower section having a maximum diameter and a minimum diameter;

the lower section having a cylindrical sleeve portion provided about the central axis, the cylindrical sleeve having a diameter less than the minimum diameter of the lower section and having an interior surface, an exterior surface and an annular recess formed in the interior surface, the recess being complementary in size and shape to receive the lip of the pop can, the lower section being sealingly connected to the pop can when the lip of the pop can is slid into the sleeve of the lower section and inserted into the recess in the sleeve;

the lower section having a floor with at least one entrance aperture formed therein and spaced a radial distance from the central axis to provide fluid passage to the chamber; and the upper section having an exit aperture formed therein and spaced a radial distance from the central axis to provide fluid passage from the chamber.

24. In a beverage drinking device, a removable mixing cap according to claim 23, wherein the upper and lower sections have air apertures formed therein.

25. In a beverage drinking device, a removable mixing cap according to claim 23, wherein:

the entrance and exit apertures are spaced from the central axis at approximately equal radial distances.

26. In a beverage drinking device, a removable mixing cap according to claim 23, wherein:

the upper and lower sections are rotatable relative to each other about the central axis to selectively orient the entrance and exit apertures relative to each other;

and wherein the upper and lower sections have indexing means for indicating when the entrance and exit apertures are aligned and when the entrance and exit apertures are not aligned.

* * * * *